(12) United States Patent
Boboshko et al.

(10) Patent No.: US 12,664,177 B1
(45) Date of Patent: Jun. 23, 2026

(54) DEPENDENCY TREE-BASED COPYING AND PASTING

(71) Applicant: SIGMA COMPUTING, INC., San Francisco, CA (US)

(72) Inventors: Vladislav Boboshko, Sunnyvale, CA (US); Dillon Morrison, San Francisco, CA (US)

(73) Assignee: SIGMA COMPUTING, INC., San Francisco, CA (US)

(*) Notice: Subject to any disclaimer, the term of this patent is extended or adjusted under 35 U.S.C. 154(b) by 49 days.

(21) Appl. No.: 18/411,437

(22) Filed: Jan. 12, 2024

(51) Int. Cl.
 *G06F 16/27* (2019.01)
 *G06F 16/2452* (2019.01)
 *G06F 16/25* (2019.01)

(52) U.S. Cl.
 CPC ........ *G06F 16/27* (2019.01); *G06F 16/24526* (2019.01); *G06F 16/252* (2019.01)

(58) Field of Classification Search
 None
 See application file for complete search history.

(56) References Cited

U.S. PATENT DOCUMENTS

| | | | | | |
|---|---|---|---|---|---|
| 5,226,161 | A * | 7/1993 | Khoyi | ....................... | G06F 9/50 |
| | | | | | 719/316 |
| 6,317,758 | B1 * | 11/2001 | Madsen | .................... | G06F 40/18 |
| | | | | | 715/220 |
| 6,320,586 | B1 * | 11/2001 | Plattner | ............... | G06F 16/9038 |
| | | | | | 707/E17.141 |
| 6,640,015 | B1 * | 10/2003 | Lafruit | .................... | H04N 19/42 |
| | | | | | 708/401 |
| 7,194,696 | B2 * | 3/2007 | Mori | ...................... | G06F 40/166 |
| | | | | | 715/764 |
| 11,514,236 | B1 * | 11/2022 | Pedapati | ............... | G06F 16/221 |
| 2002/0091728 | A1 * | 7/2002 | Kjaer | ...................... | G06F 40/18 |
| | | | | | 715/213 |
| 2007/0061752 | A1 * | 3/2007 | Cory | ...................... | G06F 9/543 |
| | | | | | 715/209 |
| 2009/0031206 | A1 * | 1/2009 | Aureglia | ................. | G06F 40/18 |
| | | | | | 715/217 |
| 2009/0044121 | A1 * | 2/2009 | Berger | .................. | G06F 3/0486 |
| | | | | | 715/724 |
| 2011/0078552 | A1 * | 3/2011 | Lumley | ................. | G06F 40/131 |
| | | | | | 715/234 |
| 2017/0193069 | A1 * | 7/2017 | Newhouse | ............ | G06F 16/275 |
| 2018/0150739 | A1 * | 5/2018 | Wu | ......................... | G06N 20/10 |
| 2021/0109943 | A1 * | 4/2021 | Frantz | .................... | G06F 16/252 |
| 2021/0342785 | A1 * | 11/2021 | Mann | ...................... | G06F 40/18 |
| 2021/0406080 | A1 * | 12/2021 | Shirolkar | ............... | G06F 40/18 |
| 2024/0028823 | A1 * | 1/2024 | Hinrichsen | ........... | G06F 40/197 |
| 2025/0245599 | A1 * | 7/2025 | Gandhi | ............ | G06Q 10/06393 |

* cited by examiner

*Primary Examiner* — Vaishali Shah

(57) ABSTRACT

Dependency tree-based copying and pasting including receiving, by a workbook manager from a client computing system, a request to paste a first workbook element from a first workbook to a second workbook, determining, by the workbook manager, that the first workbook element of the first workbook is in a first dependency relationship with one or more other workbook elements in the first workbook, copying, by the workbook manager, the one or more other workbook elements with the first workbook element to the second workbook, wherein the first dependency relationship is preserved after the copying, and presenting, by the workbook manager on the client computing system, the second workbook comprising the first workbook element and the one or more other workbook elements.

16 Claims, 10 Drawing Sheets

DEPENDENCY TREE-BASED COPYING AND PASTING

BACKGROUND

Field of the Invention

The field of the invention is data processing, or, more specifically, methods, apparatus, and products for dependency tree-based copying and pasting.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for dependency tree-based copying and pasting including receiving, by a workbook manager from a client computing system, a request to paste a first workbook element from a first workbook to a second workbook, determining, by the workbook manager, that the first workbook element of the first workbook is in a first dependency relationship with one or more other workbook elements in the first workbook, copying, by the workbook manager, the one or more other workbook elements with the first workbook element to the second workbook, wherein the first dependency relationship is preserved after the copying, and presenting, by the workbook manager on the client computing system, the second workbook comprising the first workbook element and the one or more other workbook elements.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
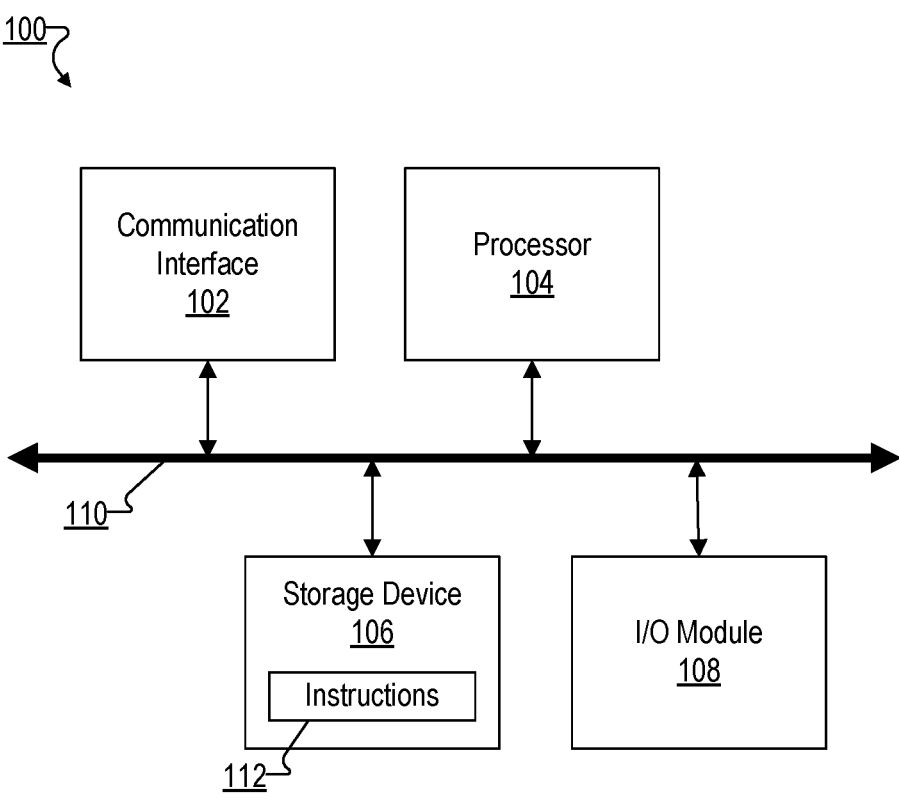
FIG. 1 sets forth a block diagram of an example system configured for dependency tree-based copying and pasting according to embodiments of the present invention.

Example methods, apparatus, and products for dependency tree-based copying and pasting in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
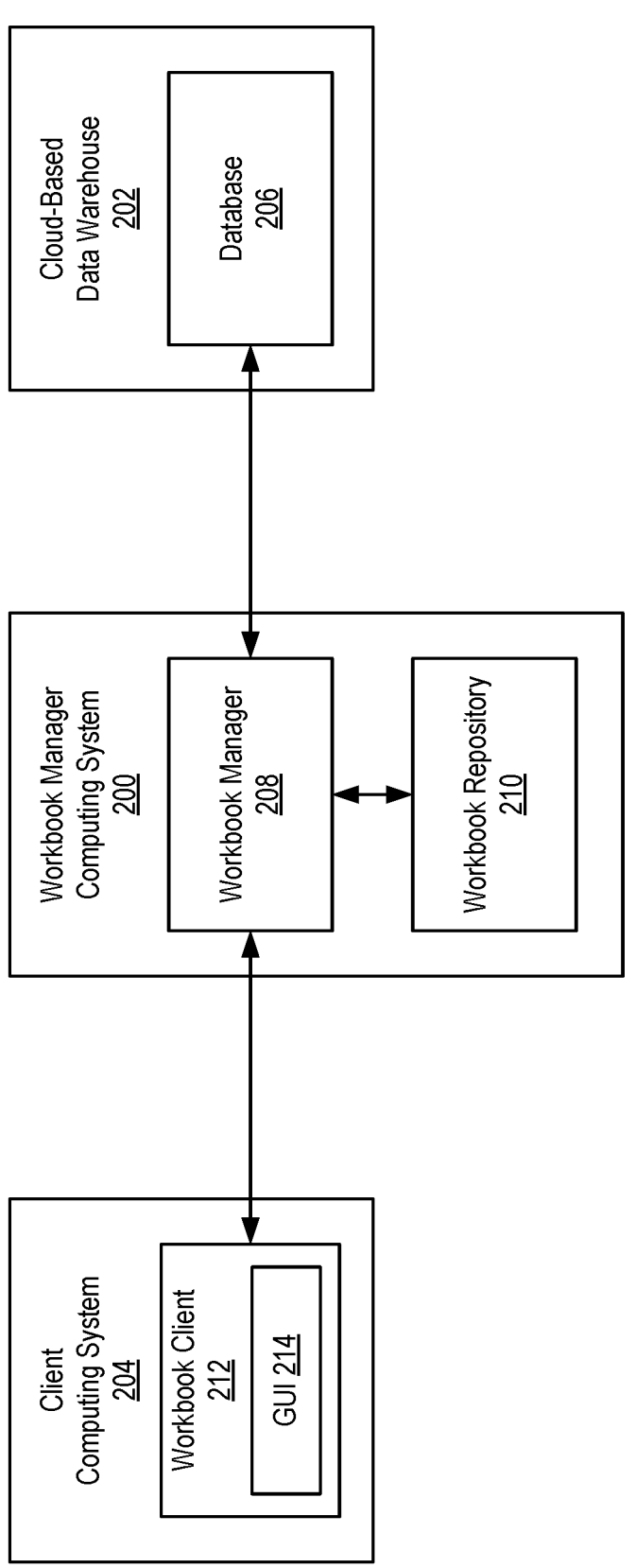
FIG. 2 sets forth a block diagram of an example system configured for dependency tree-based copying and pasting according to embodiments of the present invention.

For further explanation, FIG. 2 illustrates a block diagram depicting an exemplary system for dependency tree-based copying and pasting according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is an organizing mechanism for data and resides on the workbook manager computing system 200. The dataset may also include instructions for the retrieval of data from cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook client 212 may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
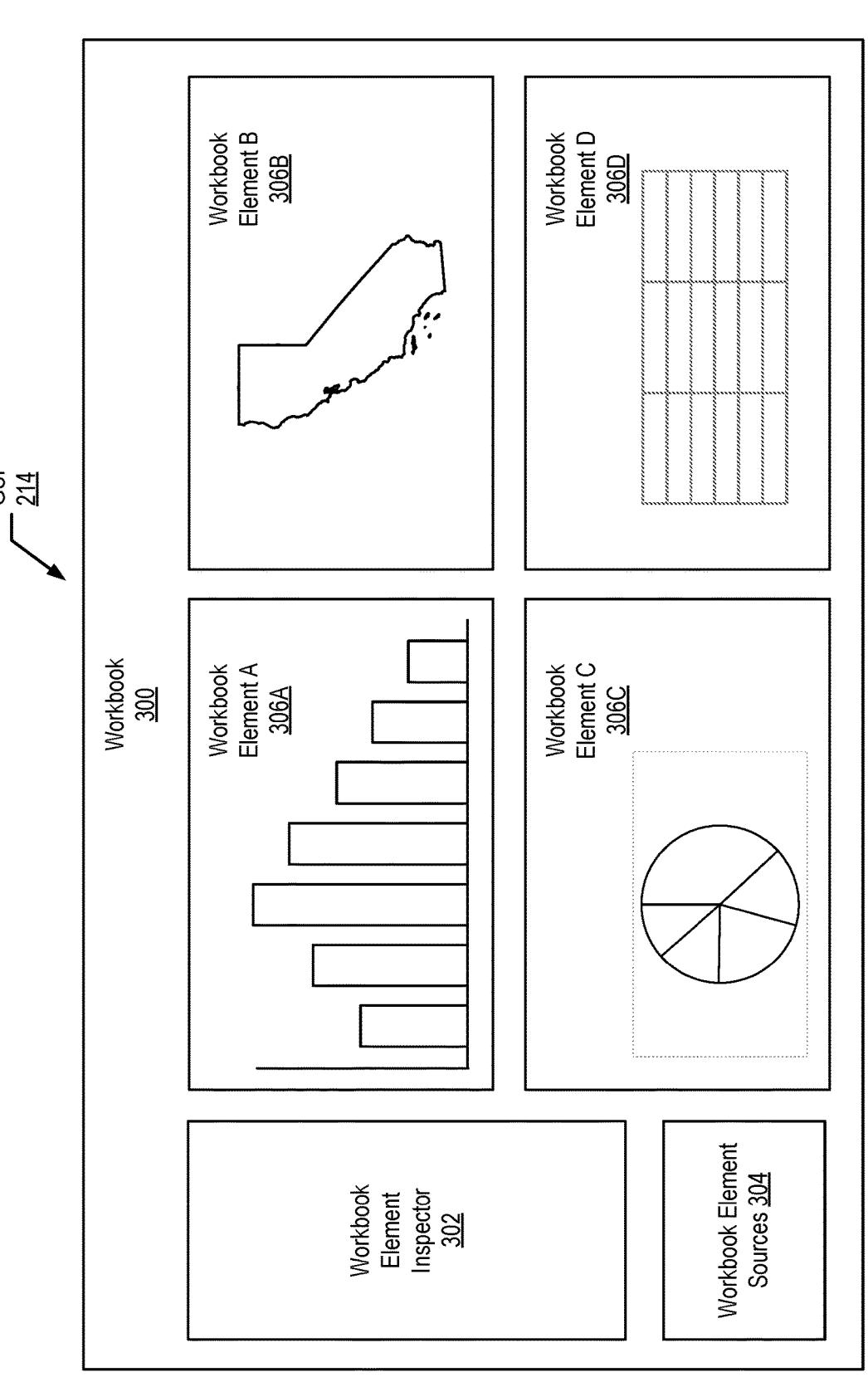
FIG. 3 sets forth a block diagram of an example system configured for dependency tree-based copying and pasting according to embodiments of the present invention.

FIG. 3 shows an exemplary GUI for dependency tree-based copying and pasting according to embodiments of the present invention. As shown in FIG. 3, the exemplary GUI 214 includes a workbook 300. The workbook 300 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a pie chart, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
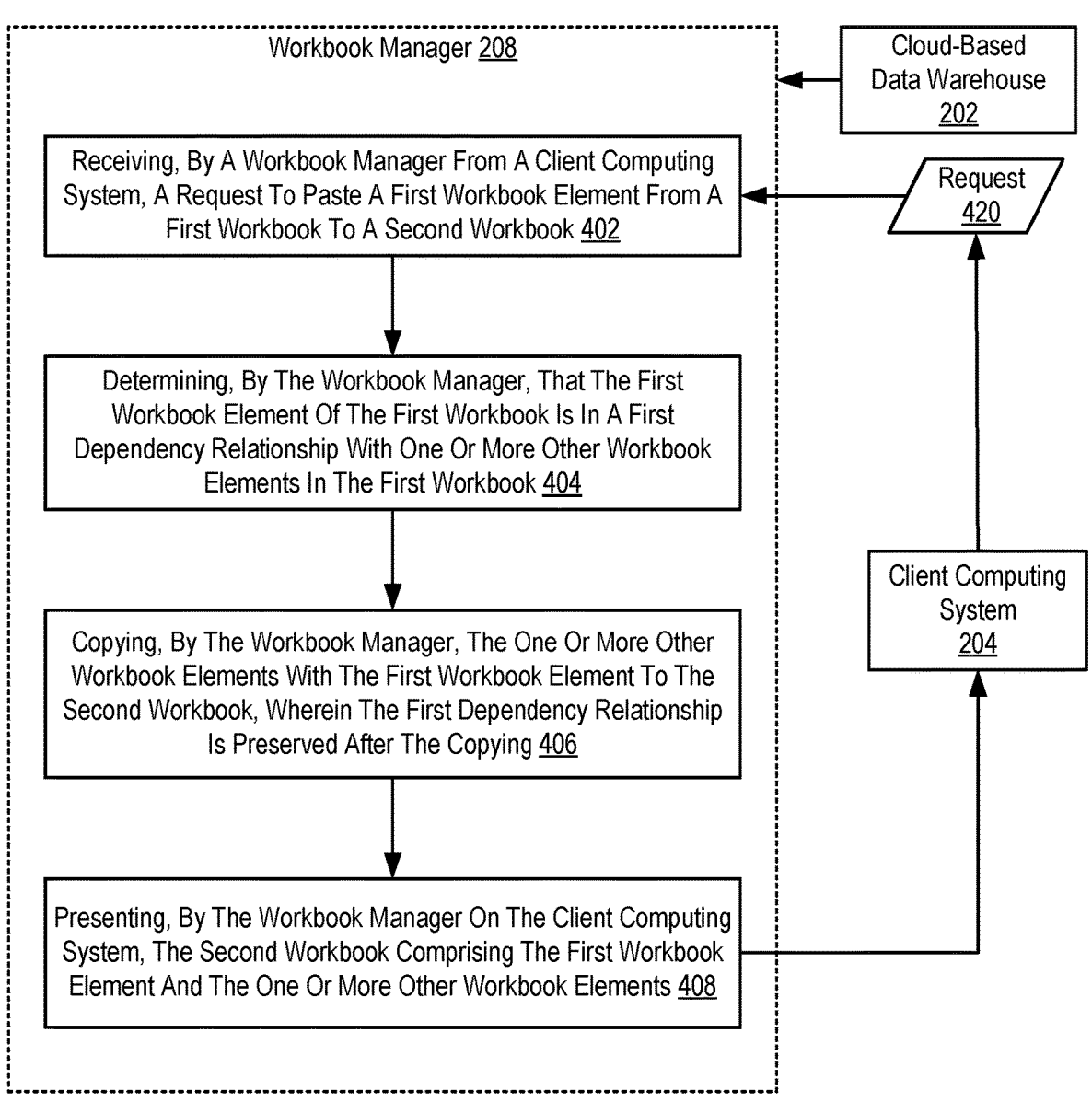
FIG. 4 sets forth a flow chart illustrating an exemplary method for dependency tree-based copying and pasting according to embodiments of the present invention.

For further explanation, FIG. 4 sets forth a flow chart illustrating an exemplary method for dependency tree-based copying and pasting according to embodiments of the present invention. The method of FIG. 4 can be implemented by, for example, workbook manager 208 which can be part of workbook manager computing system 200. The method of FIG. 4 includes receiving 402, by a workbook manager from a client computing system, a request 420 to paste a first workbook element from a first workbook to a second workbook. Receiving a request to paste a first workbook element from a first workbook to a second workbook can include receiving, via one or more user interface elements of GUI 214 of client computing system 204, one or more inputs to copy or paste a workbook element. For example, a user may have a first workbook open that is being presented using GUI 214. The user can use keyboard, mouse, or touchscreen UI elements to select a workbook element of the first workbook (e.g., workbook element C 306C), and use commands to copy the first workbook element (e.g., to a clipboard) from a first workbook and paste the workbook element into a second workbook. The second workbook may have been previously loaded for use by the user, or the user may load the second workbook using, for example, workbook client 212 after first copying the first workbook element.

The method of FIG. 4 also includes determining, by the workbook manager 404, that the first workbook element of the first workbook is in a first dependency relationship with one or more other workbook elements in the first workbook. Readers will appreciate that one or more workbook elements may be said to be in a dependency relationship with each other. As used herein, the term "dependency relationship" can refer to a data relationship in which the data or presentation of one workbook element is dependent on or generated using the data or presentation of another workbook element. Changes to the dataset or presentation of one workbook element lead to changes to the dataset or presentation of another workbook element. As an example, workbook element C 306C may be in a dependency relationship with workbook element D 306D or workbook element B 306B. In this example, workbook element C 306C, which is a pie chart, may be a visualization of text-based data from workbook element D 306D. Workbook element D 306D, for example, may be a table of values or key-value pairs, or the like. Each row of the table may contain data that is presented in the visualization of workbook element C 306C. For example, data from a row of the table of workbook element D 306D may represent one slice of the pie chart of workbook element C 306C.

Readers will appreciate that the dependency relationship between workbook element C 306C and workbook element D 306D can mean that changes to data of workbook element D 306D impact the visualization shown in workbook element C 306C. For example, if a user changes a value in a row of workbook element D 306D, that change can lead to changes to a pie slice of the pie chart of workbook element C 306C. Moreover, data transformations that are done on one workbook element, such as workbook element D 306D, can lead to changes in the dataset or presentation of another workbook element, such as workbook element C 306C.

Additionally, the dependency relationship between a first workbook element such as workbook element C 306C and a second workbook element such as workbook element D 306D can encompass different types of data relationships or connections that the second workbook element has with other workbook elements. For example, the second workbook element in the example above may be a table that is connected to the third workbook element via data table operations such as SQL JOIN, and so on.

The method of FIG. 4 also includes copying, by the workbook manager 406, the one or more other workbook elements with the first workbook element to the second workbook, wherein the first dependency relationship is preserved after the copying. In one embodiment, where the first workbook element is in a dependency relationship with one or more other workbook elements, copying and pasting the first workbook element from a first workbook to a second workbook causes the first workbook element to be copied and pasted, and also causes the one or more other workbook elements to be copied and pasted from the first workbook to the second workbook. For example, if workbook element C 306C is copied and pasted from a first workbook to a second workbook, one or more other workbook elements, such as workbook element B 306B or workbook element D 306D, can also be copied and pasted from the first workbook to the second workbook. Readers will appreciate that the single action of copying and pasting workbook element C 306C from the first workbook to the second workbook can cause the copying and pasting of workbook element B 306B or workbook element D 306D without a user having to separately copy and paste workbook element B 306B or workbook element D 306D into the second workbook. This can be because of the determined dependency relationship between workbook element C 306C and workbook element B 306B, and/or a dependency relationship between workbook element C 306C and workbook element D 306D.

The method of FIG. 4 also includes presenting 408, by the workbook manager on the client computing system, the second workbook comprising the first workbook element and the one or more other workbook elements. Presenting 408 the second workbook comprising the first workbook element and the second workbook element can include presenting the pasted first and second workbook elements as part of the second workbook. For example, workbook element C 306C may be copied and pasted from a first workbook into a second workbook. In response, workbook element C 306C is presented as part of the second workbook. And in addition, workbook element D 306D may also be presented as part of the second workbook, based on the dependency relationship between the two workbook elements. Presenting the first workbook element and the second workbook element as part of the second workbook can include presenting the two workbook elements in the manner in which they were presented in the first workbook. For example, results of operations such as formatting, sorting, data ordering, and the like that were applied to the first workbook element or the second workbook element while they were presented in the first workbook are also preserved when the two workbook elements are shown as part of the second workbook.

The above steps improve the operation of the computer system by preserving the effects of dependency relationships between workbook elements when one of the workbook elements is copied from one workbook to another workbook. This is accomplished by receiving a request to paste a workbook element from a first workbook to a second workbook, determining a dependency relationship between the two workbook elements, and copying and pasting both workbook elements to the second workbook element, while preserving aspects of the dependency relationship.

Figure 5:
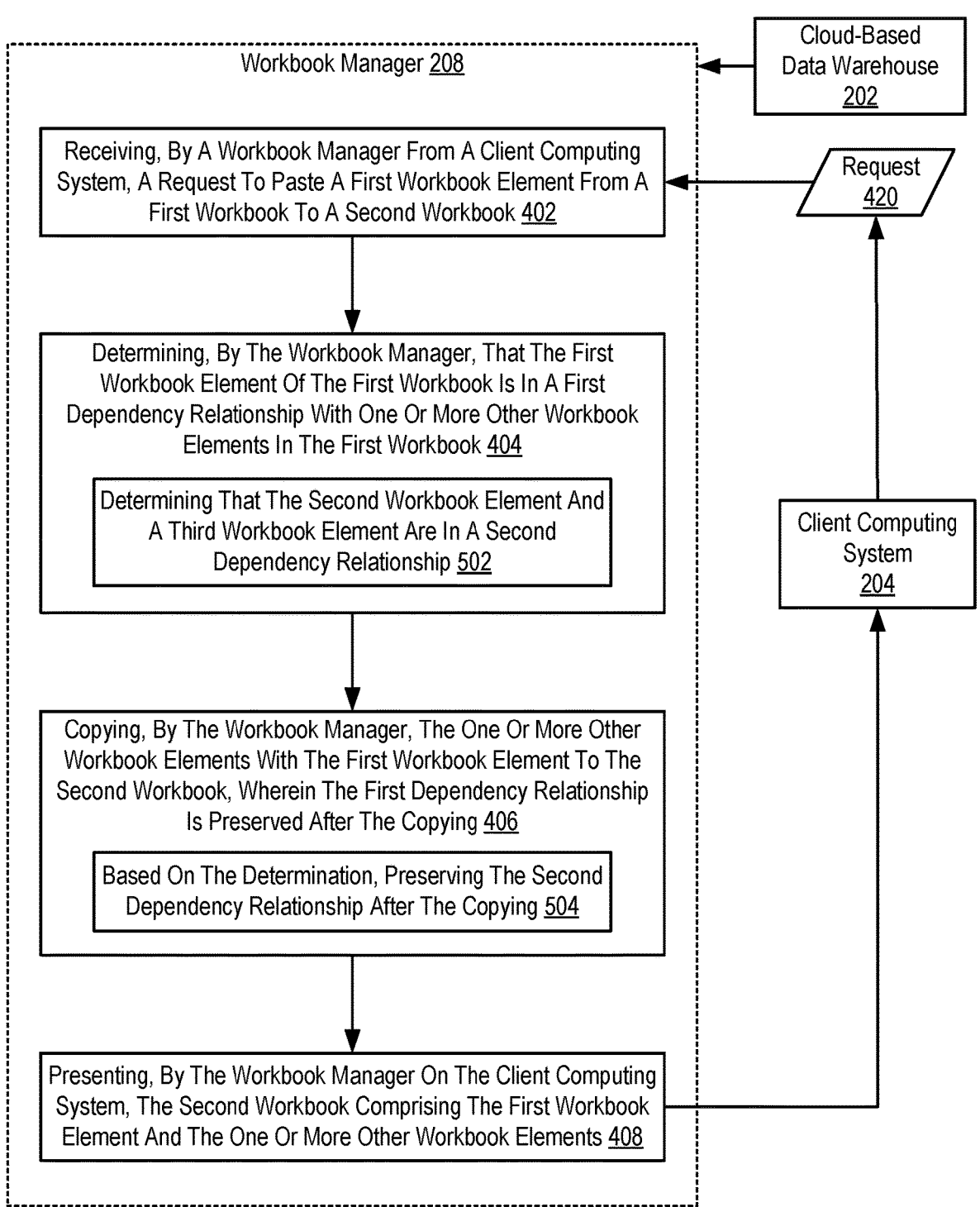
FIG. 5 sets forth a flow chart illustrating an exemplary method for dependency tree-based copying and pasting according to embodiments of the present invention.

For further explanation, FIG. 5 sets forth a flow chart illustrating a further exemplary method for dependency tree-based copying and pasting according to embodiments of the present invention that includes receiving 402, by a workbook manager from a client computing system, a request to paste a first workbook element from a first workbook to a second workbook, determining, by the workbook manager 404, that the first workbook element of the first workbook is in a first dependency relationship with one or more other workbook elements in the first workbook, copying, by the workbook manager 406, the one or more other workbook elements with the first workbook element to the second workbook, wherein the first dependency relationship is preserved after the copying, and presenting 408, by the workbook manager on the client computing system, the second workbook comprising the first workbook element and the one or more other workbook elements.

The method of FIG. 5 differs from the method of FIG. 4, however, in that the method of FIG. 5 also includes determining 502, wherein the one or more workbook elements includes a second workbook element and a third workbook element, that the second workbook element and a third workbook element are in a second dependency relationship. Recall that in the example described above, workbook element C 306C was described as being in a dependency relationship with workbook element D 306D. However, in addition, it may be determined that workbook element D 306D is itself in a second dependency relationship with another workbook element, such as workbook element B 306B. For example, workbook element B 306B may be a map of a location, showing names of geographical regions such cities and towns, along with other statistics such as population. Workbook element D 306D may be in a dependency relationship with workbook element B 306B such as workbook element D 306D tabulates the statistics and other data of the location shown workbook element B 306B. As a result, a workbook element C 306C may be said to be a 'child workbook element' of a second 'parent workbook element', workbook element D 306D, which is itself in a second dependency relationship with a third workbook element, workbook element B 306B. In this example, the second dependency relationship is also determined as part of determining the first dependency relationship.

The method of FIG. 5 also includes based on the determination, preserving 504 the second dependency relationship after the copying. Preserving 504 the second dependency relationship can be carried out in several ways. In one embodiment, the third workbook element or workbook element B 306B in the example given above, is also copied and pasted over into a second workbook in addition to copying and pasting the second workbook element (workbook element D 306D) when there is a request to copy and paste the first workbook element (workbook element C 306C). Moreover, preserving the second dependency relationship after the copying can include presenting the third workbook element in the second workbook such that results of any operations, transformations, or other changes that were applied to the third workbook element in the first workbook are also shown.

Figure 6:
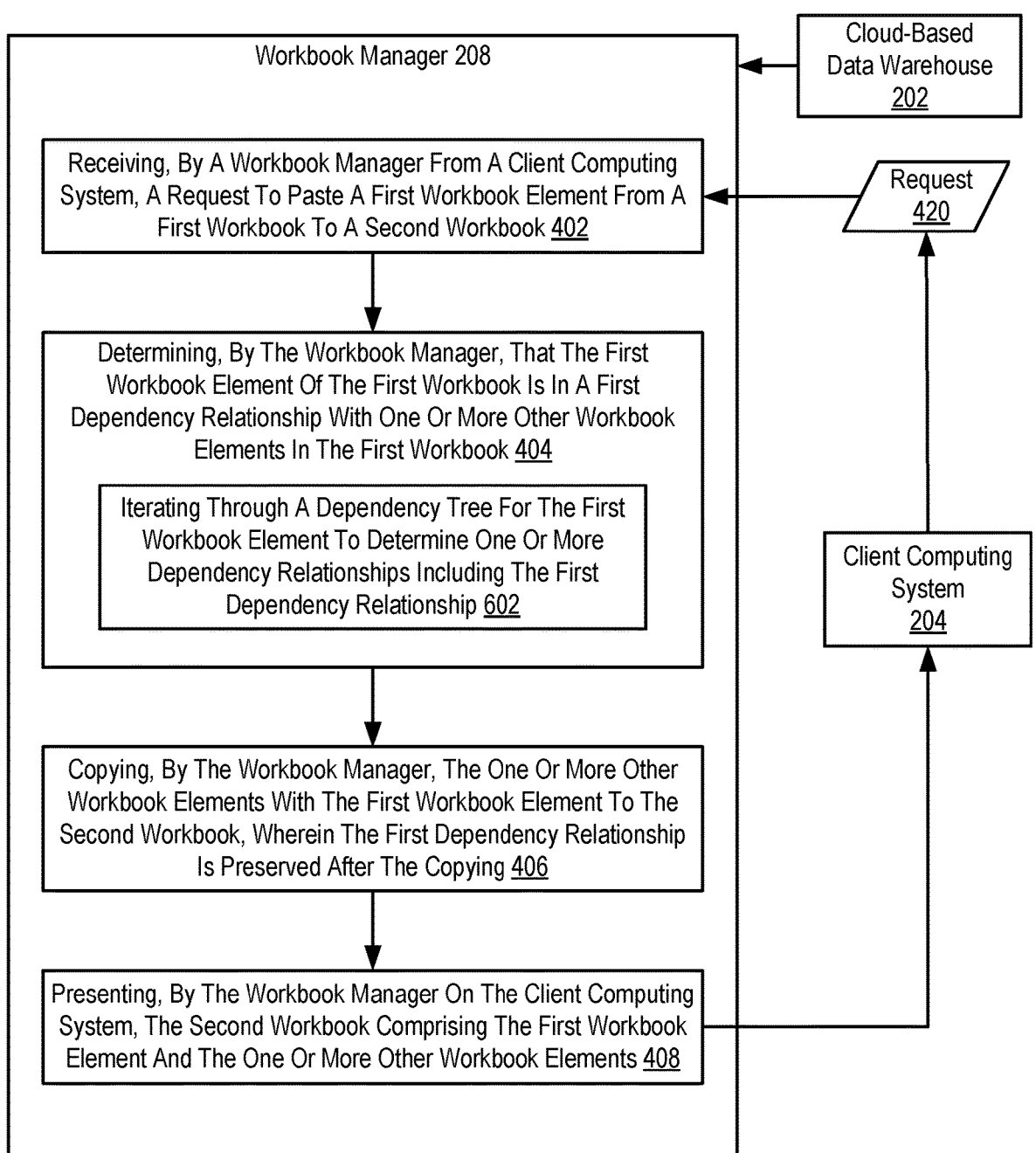
FIG. 6 sets forth a flow chart illustrating an exemplary method for dependency tree-based copying and pasting according to embodiments of the present invention.

For further explanation, FIG. 6 sets forth a flow chart illustrating a further exemplary method for dependency tree-based copying and pasting according to embodiments of the present invention that includes receiving 402, by a workbook manager from a client computing system, a request to paste a first workbook element from a first workbook to a second workbook, determining, by the workbook manager 404, that the first workbook element of the first workbook is in a first dependency relationship with one or more other workbook elements in the first workbook, copying, by the workbook manager 406, the one or more other workbook elements with the first workbook element to the second workbook, wherein the first dependency relationship is preserved after the copying, and presenting 408, by the workbook manager on the client computing system, the second workbook comprising the first workbook element and the one or more other workbook elements.

The method of FIG. 6 differs from the method of FIG. 4, however, in that the method of FIG. 6 also includes iterating 602 through a dependency tree for the first workbook element to determine one or more dependency relationships including the first dependency relationship. Iterating 602 through a dependency tree can be carried out in several ways. Readers will appreciate that the dependency relationships described above can be stored in various ways, such as in different data structures like a tree, a graph, a linked list, or other data structures. Accordingly, iterating 602 through a dependency tree can include receiving an identification of a workbook element that is selected for copying and pasting, such as workbook element C 306C, and then traversing a data structure that stores dependency relationships for workbook element C 306C in order to identify other workbook elements that are in dependency relationship with workbook element C 306C. As an example, workbook element C 306C may be a leaf node of a tree structure that also includes workbook element D 306D as an internal node or branch node, and the tree structure could also include workbook element B 306B as another branch node, or as a root node. Accordingly, iterating 602 through such a dependency tree can include starting at a first node corresponding to the workbook element selected for copying and pasting, and traversing 'up' the tree up to one or more levels. In one example, this traversal can be done until a root node corresponding to the first node is identified. Then all dependency relationships that are on the path from the first node to the root node are identified, and data for each dependency relationship is preserved and used when the selected workbook elements and the one or more other workbook elements are pasted into the second workbook.

Figure 7:
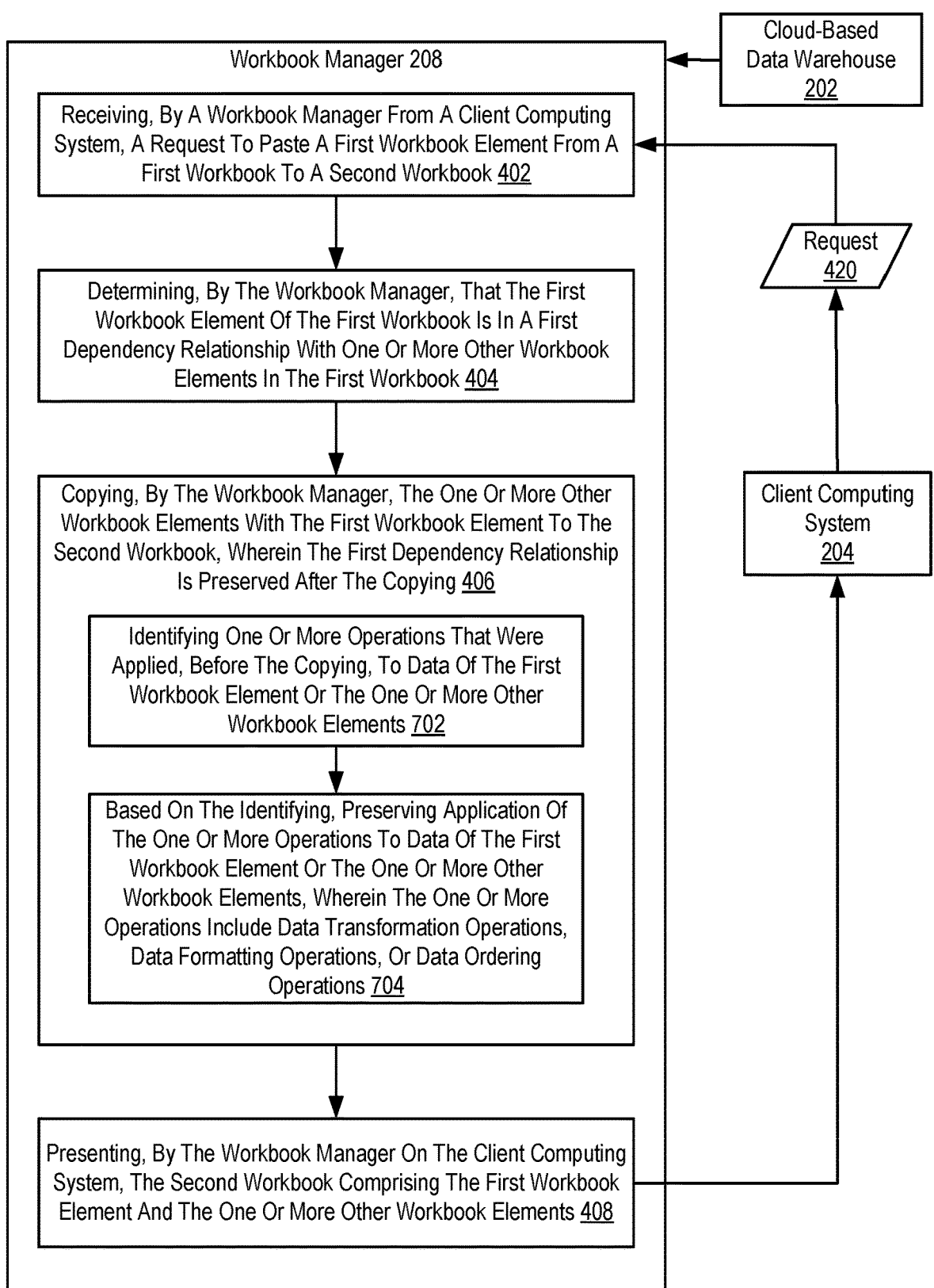
FIG. 7 sets forth a flow chart illustrating an exemplary method for dependency tree-based copying and pasting according to embodiments of the present invention.

For further explanation, FIG. 7 sets forth a flow chart illustrating a further exemplary method for dependency tree-based copying and pasting according to embodiments of the present invention that includes receiving 402, by a workbook manager from a client computing system, a request to paste a first workbook element from a first workbook to a second workbook, determining, by the workbook manager 404, that the first workbook element of the first workbook is in a first dependency relationship with one or more other workbook elements in the first workbook, copying, by the workbook manager 406, the one or more other workbook elements with the first workbook element to the second workbook, wherein the first dependency relationship is preserved after the copying, and presenting 408, by the workbook manager on the client computing system, the second workbook comprising the first workbook element and the one or more other workbook elements.

The method of FIG. 7 differs from the method of FIG. 4, however, in that the method of FIG. 7 also includes identifying 702 one or more operations that were applied, before the copying, to data of the first workbook element or the one or more other workbook elements. The one or more operations that were applied before the copying to the first workbook element can include different types of operations. For example, the operations can include data transformation operations. These can include mathematical or statistical transformations such as matrix operations, query-based transformations, and/or operations to aggregate, merge, distribute, translate, or modify data. These operations can include table join operations (e.g., inner join, self-join, outer join, etc.), application of formulae, and the like. The operations can also include results of processing by statistical models, machine learning models, and the like.

The one or more operations can also include data formatting operations, such as certain font, color, text format, language, or other settings applied to the data or presentation of a workbook element. The one or more operations can also include structuring or ordering operations such as operations to filter or sort data, such as operations to select certain rows or columns based on conditions, or to order data in certain ways (order data in a column by greatest to least values, etc.) and so on. As an example, workbook element D 306D may have one or more operations applied to it when part of a first workbook, where workbook element C 306C is also part of the first workbook and workbook element C 306C is in a dependency relationship with workbook element D 306D.

The method of FIG. 7 also includes based on the identifying, preserving 704 application of the one or more operations to data of the first workbook element or the one or more other workbook elements, wherein the one or more operations include data transformation operations, data formatting operations, or data ordering operations. Continuing with the example above, when there is a request to copy and paste workbook element C 306C into a second workbook, workbook element D 306D may also be copied and pasted as described above based on a determination of the dependency relationship. In addition, any operations that were applied to workbook element D 306D in the first workbook are also preserved as workbook element D 306D is pasted into the second workbook. For example, any data transformation, formatting, structuring, ordering, or other operations applied to the data or presentation of workbook element D 306D in the first workbook are also in effect for workbook element D 306D in the second workbook.

Figure 8:
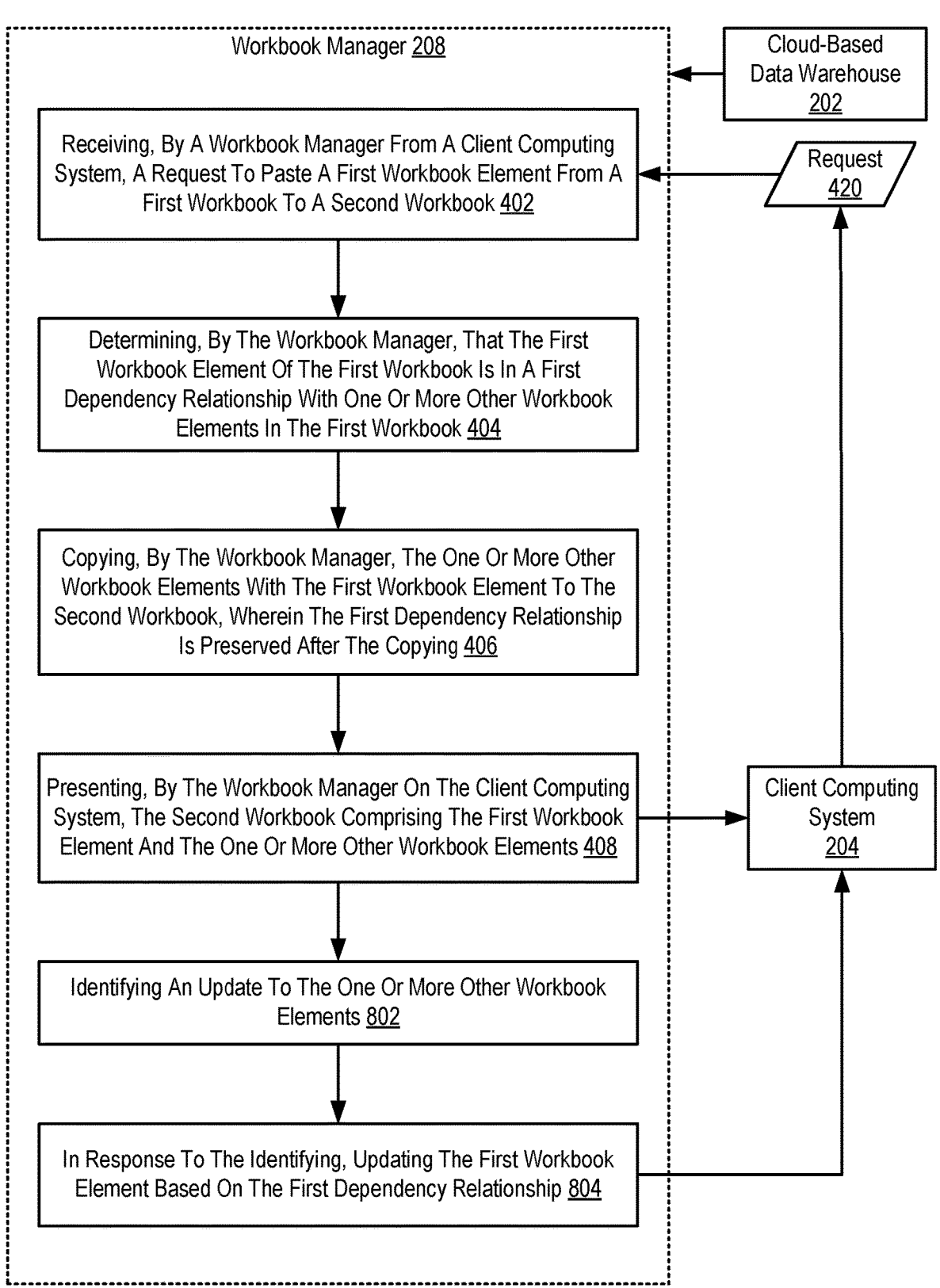
FIG. 8 sets forth a flow chart illustrating an exemplary method for dependency tree-based copying and pasting according to embodiments of the present invention.

For further explanation, FIG. 8 sets forth a flow chart illustrating a further exemplary method for dependency tree-based copying and pasting according to embodiments of the present invention that includes receiving 402, by a workbook manager from a client computing system, a request to paste a first workbook element from a first workbook to a second workbook, determining, by the workbook manager 404, that the first workbook element of the first workbook is in a first dependency relationship with one or more other workbook elements in the first workbook, copying, by the workbook manager 406, the one or more other workbook elements with the first workbook element to the second workbook, wherein the first dependency relationship is preserved after the copying, and presenting 408, by the workbook manager on the client computing system, the second workbook comprising the first workbook element and the one or more other workbook elements.

The method of FIG. 8 differs from the method of FIG. 4, however, in that the method of FIG. 8 also includes identifying 802 an update to the one or more other workbook elements. Identifying an update to the one or more other workbook elements can include identifying a change to the data or presentation of a second workbook element where the selected (first) workbook element is in a dependency relationship with the second workbook element. In an example where workbook element C 306C has a dependency on workbook element D 306D, identifying the update can include identifying that data of workbook element D 306D has changed. For example, a row of the table of workbook element D 306D may have new data. As another example, identifying the update can include identifying that the data of workbook element B 306B has changed (e.g., there is a new city name on the map) where, in this example, workbook element C 306C is in dependency relationship with workbook element D 306D, which is itself in a dependency relationship with workbook element B 306B.

Identifying the update can also include identifying an update to the presentation of the one or more workbook elements. Continuing with the example of workbook element D 306D, a user may change the presentation of data in the table of workbook element D 306D from an aggregated (e.g., a sum of values from a group of rows or columns) presentation to a disaggregated (e.g., showing the individual values from each row or column), thereby causing an update that is identified as indicated herein.

The method of FIG. 8 also includes in response to the identifying, updating 804 the first workbook element based on the first dependency relationship. Updating the first workbook element based on the first dependency relationship can include showing new data in the first workbook element. For example, where row of the table of workbook element D 306D has new data, then workbook element C 306C can be updated to show the change in response (e.g., a pie slice of the pie chart is updated). Similarly, updating the first workbook element can include updating a presentation of the first workbook element based on a change to data or presentation of one or more other workbook elements. For example, where workbook element D 306D's data was disaggregated, the presentation of workbook element C 306C may change (e.g., to show a pie slice for each row, rather than for aggregated values).

Moreover, in some embodiments, updating the first workbook element based on the first dependency relationship can include updating the first workbook element when there is a change to one or more other workbook elements in a first (source) workbook from where the first workbook element is copied or a second (target) workbook to which the first workbook element is copied. For example, where workbook element C 306C is in a dependency relationship with workbook element D 306D, then changes to workbook element D 306D affect workbook element C 306C regardless of whether these changes are made in the first (source) workbook or the second (target) workbook for the copy operation for workbook element C 306C.

Figure 9:
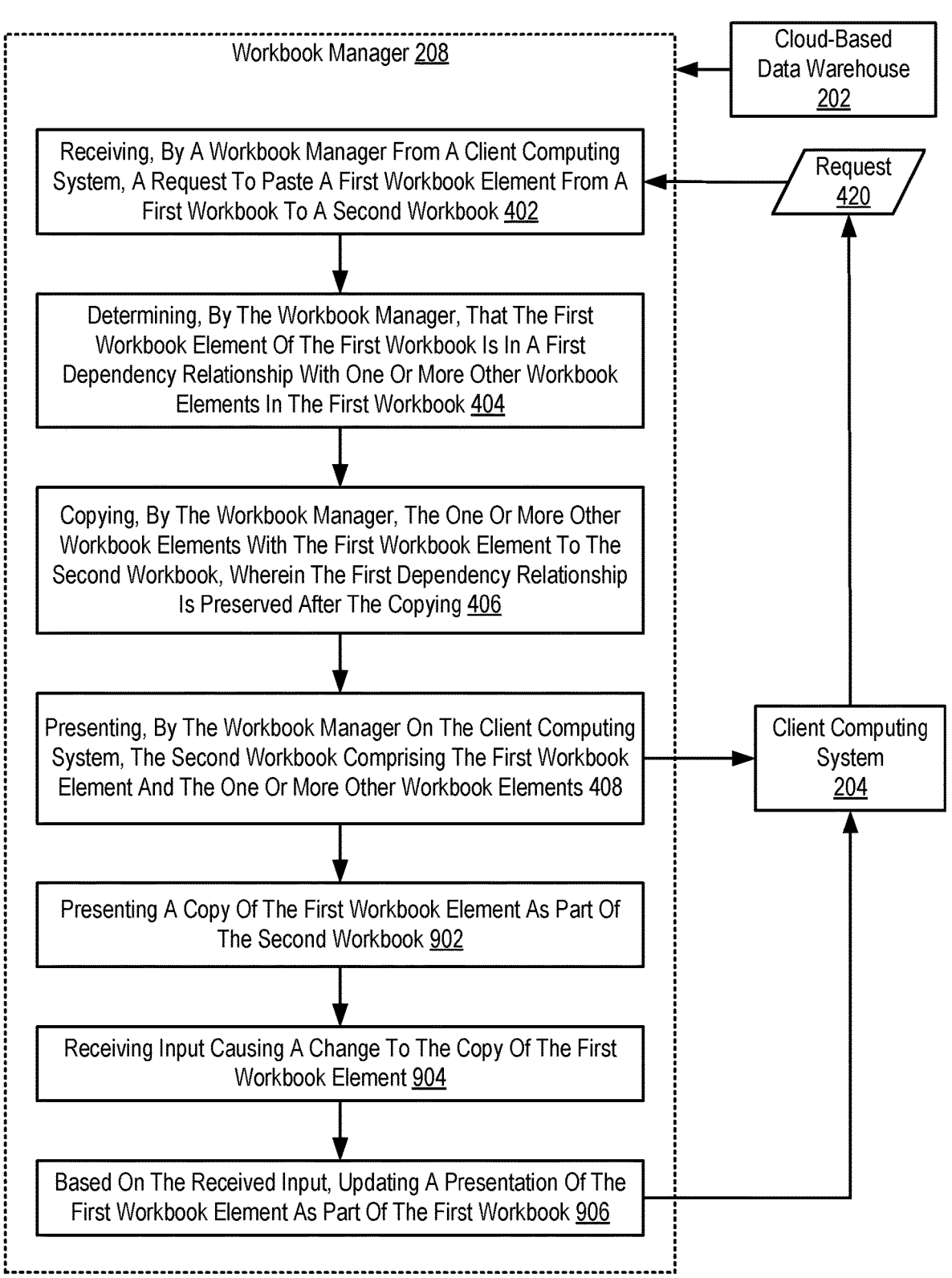
FIG. 9 sets forth a flow chart illustrating an exemplary method for dependency tree-based copying and pasting according to embodiments of the present invention.

For further explanation, FIG. 9 sets forth a flow chart illustrating a further exemplary method for dependency tree-based copying and pasting according to embodiments of the present invention that includes receiving 402, by a workbook manager from a client computing system, a request to paste a first workbook element from a first workbook to a second workbook, determining, by the workbook manager 404, that the first workbook element of the first workbook is in a first dependency relationship with one or more other workbook elements in the first workbook, copying, by the workbook manager 406, the one or more other workbook elements with the first workbook element to the second workbook, wherein the first dependency relationship is preserved after the copying, and presenting 408, by the workbook manager on the client computing system, the second workbook comprising the first workbook element and the one or more other workbook elements.

The method of FIG. 9 differs from the method of FIG. 4, however, in that the method of FIG. 9 also includes presenting 902 a copy of the first workbook element as part of the second workbook. Presenting a copy of the first workbook element as part of the second workbook can include presenting a copy of the first workbook element in the same manner as it was presented as part of the first workbook. The same data and presentation aspects (font/color, sorting, ordering, etc.) are preserved for the first workbook element after being copied to the second workbook.

The method of FIG. 9 also includes receiving input 904 causing a change to the copy of the first workbook element. Receiving the input includes receiving input causing a change to first workbook element as it is shown as part of the second workbook after the copying and pasting. For example, the workbook element C 306C may be copied to a second workbook. Then a user may change the copy of workbook element C 306C from the second workbook.

The method of FIG. 9 also includes, based on the received input, updating 906 a presentation of the first workbook element as part of the first workbook. Continuing with the example above, in response to the received input, the instance of the first workbook element that would be shown as part of the first workbook is also updated according to the change made to the first workbook element from the second workbook. For example, the copy of workbook element C 306C is shown in the first workbook as being updated as a result of the change that was made using the second workbook to workbook element C 306C.

Figure 10:
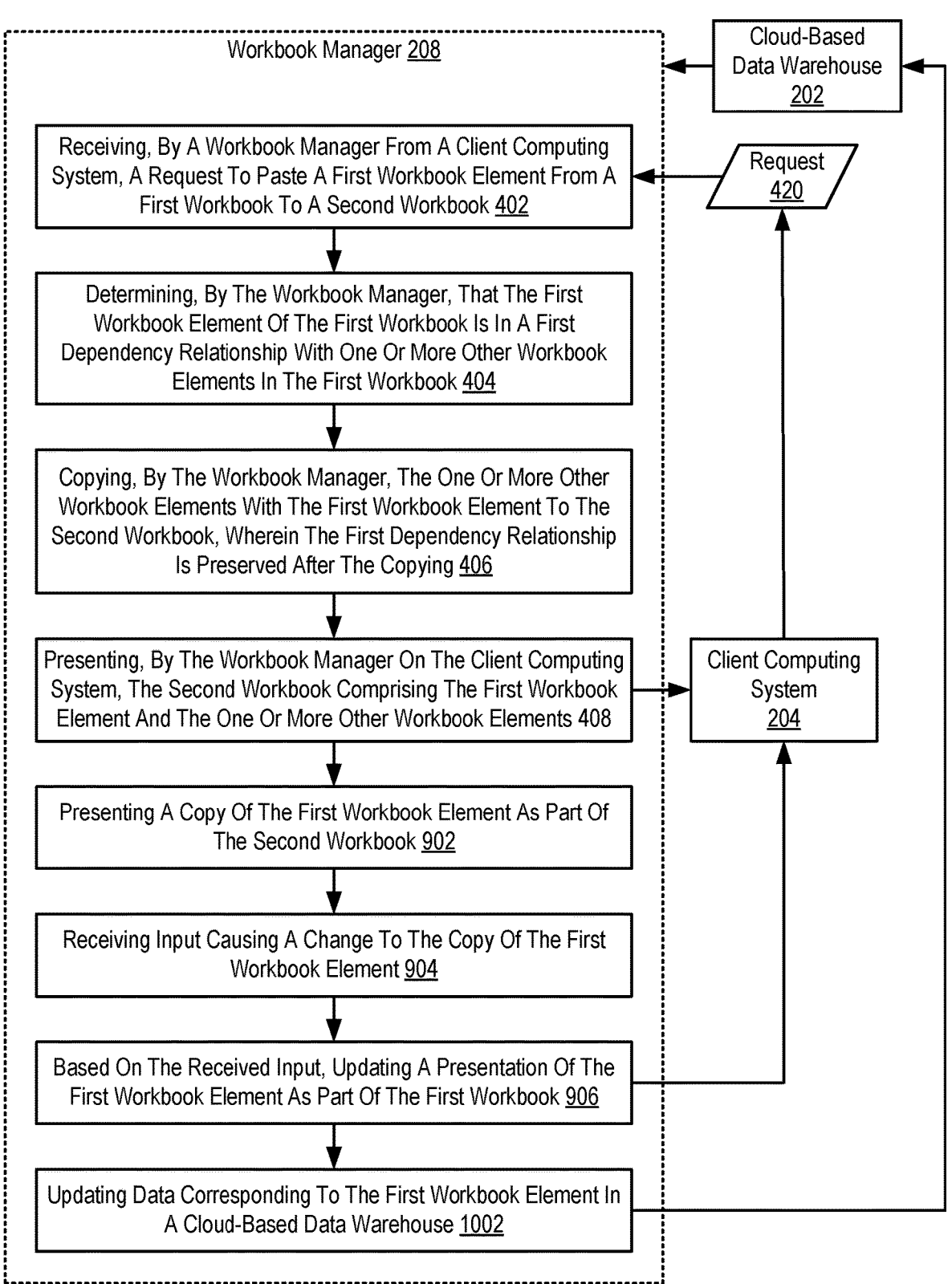
FIG. 10 sets forth a flow chart illustrating an exemplary method for dependency tree-based copying and pasting according to embodiments of the present invention.

For further explanation, FIG. 10 sets forth a flow chart illustrating a further exemplary method for dependency tree-based copying and pasting according to embodiments of the present invention that includes receiving 402, by a workbook manager from a client computing system, a request to paste a first workbook element from a first workbook to a second workbook, determining, by the workbook manager 404, that the first workbook element of the first workbook is in a first dependency relationship with one or more other workbook elements in the first workbook, copying, by the workbook manager 406, the one or more other workbook elements with the first workbook element to the second workbook, wherein the first dependency relationship is preserved after the copying, and presenting 408, by the workbook manager on the client computing system, the second workbook comprising the first workbook element and the one or more other workbook elements.

The method of FIG. 10 differs from the method of FIG. 4, however, in that the method of FIG. 10 also includes updating 1002 data corresponding to the first workbook element in a cloud-based data warehouse. Readers will appreciate that the data that is presented using the first workbook element may be stored in a cloud-based data warehouse, such as cloud-based data warehouse 202. Continuing with the examples provided above, a user may make changes to workbook element C 306C, either through a first workbook that includes this workbook element or through a second workbook element to which the workbook element was copied. Based on the changes that are made to workbook element C 306C, the data that was stored in cloud-based data warehouse 202 for workbook element C 306C is also updated to reflect the changes.

Moreover, as described above, workbook element C 306C may be in a dependency relationship with workbook element D 306D. In such a case, where there is an update to workbook element D 306D (whether in a first workbook or a second workbook, where workbook element C 306C is copied from the first workbook to the second workbook), the update to workbook element D 306D can cause changes to data or presentation for workbook element D 306D and to workbook element C 306C. These changes with respect to workbook element D 306D are reflected in data in cloud-based data warehouse for workbook element D 306D as well as for workbook element C 306C. In other words, changes to workbook element D 306D automatically cause changes to the data for workbook element C 306C that is stored in cloud-based data warehouse 202 without additional user actions.

In view of the explanations set forth above, readers will recognize that the benefits of dependency tree-based copying and pasting according to embodiments of the present invention include:

Improving the operation of the computer system by reducing user effort in updating data of a workbook element, increasing system utility by copying over related workbook elements that may have to be updated in order to changes to the workbook element to take effect.

Improving the operation of the computer system by reducing user effort in updating formatting or other features of a workbook element, increasing system utility by preserving characteristics of the workbook element plus characteristics of other workbook elements that are in a dependency relationship with the first workbook.

Exemplary embodiments of the present invention are described largely in the context of a fully functional computer system for dependency tree-based copying and pasting. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
receiving, by a workbook manager from a client computing system, a request to paste a first workbook element from a first workbook to a second workbook, wherein each workbook element includes a collection of graphical elements;
determining, by the workbook manager, that the first workbook element of the first workbook is in a first dependency relationship with one or more other workbook elements in the first workbook, including iterating, in response to the request to paste, through a dependency tree for the first workbook element to determine one or more dependency relationships including the first dependency relationship, wherein the dependency tree comprises nodes corresponding to workbook elements, wherein iterating includes traversing from a first node corresponding to the first workbook element toward a root node and identifying workbook elements dependent on the first workbook element for copying and preserving the dependencies;
copying, by the workbook manager in response to the determining, the one or more other workbook elements from the first workbook with the first workbook element to the second workbook, wherein the first dependency relationship is preserved after the copying; and
presenting, by the workbook manager on the client computing system, the second workbook comprising the first workbook element and the one or more other workbook elements.

2. The method of claim 1, wherein the one or more other workbook elements includes a second workbook element and a third workbook element, and wherein determining that the first workbook element of the first workbook is in a first dependency relationship with one or more other workbook elements in the first workbook comprises, based on a determination that the second workbook element and the third workbook element are in a second dependency relationship, preserving the second dependency relationship after the copying.

3. The method of claim 1, wherein the first workbook element includes a first data set that is hosted on a cloud-based data warehouse, and wherein the first data set is retrieved in response to a first database query that is composed to retrieve, from the cloud-based data warehouse, the first data set corresponding to the first workbook element.

4. The method of claim 1, further comprising:
identifying an update to the one or more other workbook elements; and
in response to the identifying, updating the first workbook element based on the first dependency relationship.

5. The method of claim 1, wherein the first workbook element is copied to a second workbook, further comprising:
presenting a copy of the first workbook element as part of the second workbook;
receiving input causing a change to the copy of the first workbook element; and
based on the received input, updating a presentation of the first workbook element as part of the first workbook.

6. The method of claim 5, further comprising:
in response to the received input, updating data corresponding to the first workbook element in a cloud-based data warehouse.

7. An apparatus for dependency tree-based copying and pasting, the apparatus comprising a computer processor, a computer memory operatively coupled to the computer processor, the computer memory having disposed within it computer program instructions that, when executed by the computer processor, cause the apparatus to carry out:

receiving, from a client computing system, a request to paste a first workbook element from a first workbook to a second workbook, wherein each workbook element includes a collection of graphical elements;

determining that the first workbook element of the first workbook is in a first dependency relationship with one or more other workbook elements in the first workbook, including iterating, in response to the request to paste, through a dependency tree for the first workbook element to determine one or more dependency relationships including the first dependency relationship, wherein the dependency tree comprises nodes corresponding to workbook elements, wherein iterating includes traversing from a first node corresponding to the first workbook element toward a root node and identifying workbook elements dependent on the first workbook element for copying and preserving the dependencies;

copying, in response to the determining, the one or more other workbook elements from the first workbook with the first workbook element to the second workbook, wherein the first dependency relationship is preserved after the copying; and presenting, on the client computing system, the second workbook comprising the first workbook element and the one or more other workbook elements.

8. The apparatus of claim 7, wherein the one or more other workbook elements includes a second workbook element and a third workbook element, and wherein the computer program instructions further cause the apparatus to carry out, based on a determination that the second workbook element and the third workbook element are in a second dependency relationship, preserving the second dependency relationship after the copying.

9. The apparatus of claim 7, wherein the computer program instructions further cause the apparatus to carry out:

identifying one or more operations that were applied, before the copying, to data of the first workbook element or the one or more other workbook elements; and based on the identifying, preserving application of the one or more operations to data of the first workbook element or the one or more other workbook elements, wherein the one or more operations include data transformation operations, data formatting operations, or data ordering operations.

10. The apparatus of claim 7, wherein the first workbook element includes a first data set that is hosted on a cloud-based data warehouse, and wherein the first data set is retrieved in response to a first database query that is composed to retrieve, from the cloud-based data warehouse, the first data set corresponding to the first workbook element.

11. The apparatus of claim 7, wherein the computer program instructions further cause the apparatus to carry out:

identifying an update to the one or more other workbook elements; and in response to the identifying, updating the first workbook element based on the first dependency relationship.

12. The apparatus of claim 7, wherein the first workbook element is copied to a second workbook, wherein the computer program instructions further cause the apparatus to carry out:

presenting a copy of the first workbook element as part of the second workbook;

receiving input causing a change to the copy of the first workbook element; and based on the received input, updating a presentation of the first workbook element as part of the first workbook.

13. The apparatus of claim 12, wherein the computer program instructions further cause the apparatus to carry out:

in response to the received input, updating data corresponding to the first workbook element in a cloud-based data warehouse.

14. A computer program product for dependency tree-based copying and pasting, the computer program product comprising a non-transitory computer readable medium having computer program instructions stored therein that, when executed, cause a computer to carry out:

receiving, from a client computing system, a request to paste a first workbook element from a first workbook to a second workbook, wherein each workbook element includes a collection of graphical elements;

determining that the first workbook element of the first workbook is in a first dependency relationship with one or more other workbook elements in the first workbook, including iterating, in response to the request to paste, through a dependency tree for the first workbook element to determine one or more dependency relationships including the first dependency relationship, wherein the dependency tree comprises nodes corresponding to workbook elements, wherein iterating includes traversing from a first node corresponding to the first workbook element toward a root node and identifying workbook elements dependent on the first workbook element for copying and preserving the dependencies;

copying, in response to the determining, the one or more other workbook elements from the first workbook with the first workbook element to the second workbook, wherein the first dependency relationship is preserved after the copying; and presenting, on the client computing system, the second workbook comprising the first workbook element and the one or more other workbook elements.

15. The computer program product of claim 14, wherein the one or more other workbook elements includes a second workbook element and a third workbook element, and wherein the computer program instructions further cause the computer to carry out, based on a determination that the second workbook element and the third workbook element are in a second dependency relationship, preserving the second dependency relationship after the copying.

16. The computer program product of claim 14, wherein the computer program instructions further cause the computer to carry out:

identifying one or more operations that were applied, before the copying, to data of the first workbook element or the one or more other workbook elements; and based on the identifying, preserving application of the one or more operations to data of the first workbook element or the one or more other workbook elements, wherein the one or more operations include data transformation operations, data formatting operations, or data ordering operations.

* * * * *